Dec. 27, 1955    R. D. DENING    2,728,077
SHUTTER MECHANISM
Filed Nov. 20, 1952
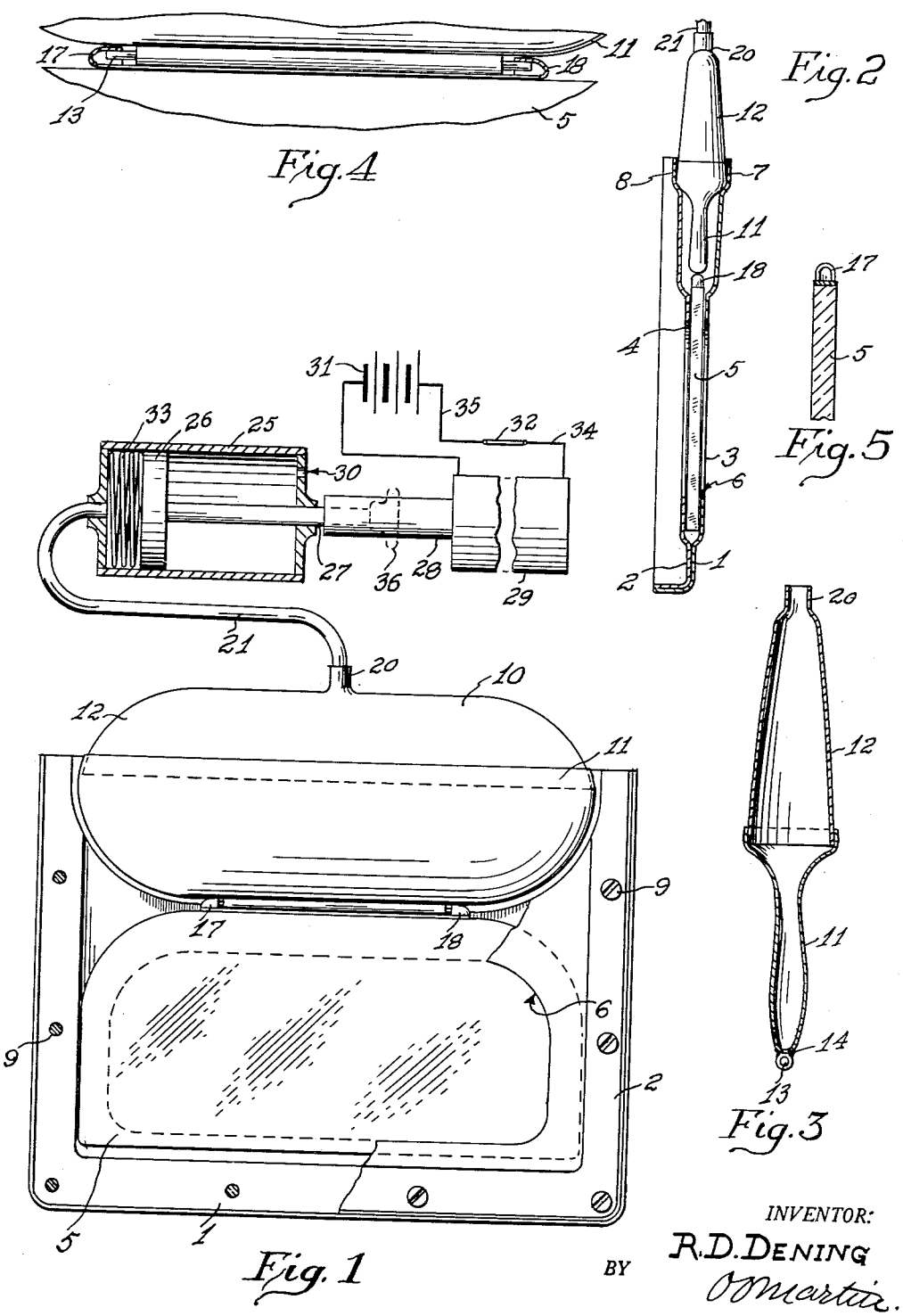
INVENTOR:
R. D. DENING
BY
O. Martin.
ATTORNEY.

United States Patent Office 2,728,077
Patented Dec. 27, 1955

2,728,077

SHUTTER MECHANISM

Robert D. Dening, Los Angeles, Calif.

Application November 20, 1952, Serial No. 321,650

1 Claim. (Cl. 2—8)

This invention relates to eye protectors such as used in welders' helmets and is an improvement on the device disclosed in Patent No. 2,549,964, issued to me on April 24, 1951.

The device of this prior patent includes a frame mountable in a welding helmet as forming part of welding goggles. In this frame is provided an eye opening and a glare-proof lens is seated for vertical sliding movement within the frame normally to cover this eye opening. Suction actuated shutter means is rigidly secured to the frame and permanently combined with the lens. It is operable by the wearer of the helmet to raise the lens within the frame thereby to uncover the eye opening thereof.

Devices of this type are subject to rough use and it frequently happens that the lens becomes broken in handling the device. In such cases, it becomes necessary to replace the entire lens and shutter combination and, since a portion of the shutter means is rigidly secured to the frame, it is generally found necessary to discard the entire combination, frame and all, a relatively expensive proposition.

It is in view of the foregoing the object of the present invention to provide, in a device of the type referred to, means for detachably securing the lens in position on the shutter mechanism to the end that, in case of breakage, it is merely required to open the frame and to detach the lens, if indeed in breaking it has not already become detached. A new lens may then be attached to the shutter mechanism and when the frame again is closed, it is found that the lens will be locked in operative position therein.

It is a further object of my invention to provide a lens shutter mechanism which is freely seatable in the frame and locked in position therein when the frame is closed. When such detachable shutter mechanism is provided there is no difficulty in opening and closing the frame.

These and other objects of the invention will become apparent upon perusal of the following detailed description and by referring to the accompanying drawing in which a preferred form of the invention is illustrated.

In the drawing:

Fig. 1 is a front elevational view of a device embodying the invention;

Fig. 2 is an end view of the device with the frame thereof partly broken away for the sake of clearness;

Fig. 3 is a cross sectional end view on a larger scale of the lens shutter mechanism as it appears before installation;

Fig. 4 is a fragmentary view illustrating the manner in which the lens and shutter mechanism is assembled; and Fig. 5 is a fragmentary end view of the lens.

The frame of the device consists of a flanged plate 1 within the flange of which a second flanged plate 2 is snugly seated, substantially as indicated in Fig. 2 of the drawing. This frame is of the rectangular shape best suited for installation in a welder's helmet but it may be any other suitable shape. The two plates are recessed right and left, as indicated at 3, 4 in Fig. 2, to provide a pocket for the glare-proof lens 5 and these recessed portions of the plate are perforated to form a window 6 for passage of light when the lens is lifted out of the pocket, as will now be described.

The structure by means of which the lens is operated consists of a casing 10, the lower pocket or pouch-shaped half-portion 11 of which is collapsible into the similarly shaped upper portion 12. The latter is for this purpose made from rigid material, such as sheet steel, but the material of the lower portion 11 which, for simplicity of description may be termed the bellows of the casing, must be highly flexible and I have found neoprene ideally suited for this purpose. This lower portion is rigidly secured in position on the outer surface of the upper part 12 by means of a suitable solvent. The casing 10 is, as best shown in Fig. 2, held rigidly in position within the curved seat formed between the widened upper portions 7, 8 of the recesses 3, 4 when the frame parts 1, 2 by means of the screws 9 are clamped together. As best indicated in Fig. 4, I have placed a resilient rod 13 transversely along the bottom surface of the casing member 11, and it may be integrally combined therewith by coating the rod with a similar plastic composition 14, see Fig. 3, which by polymerization may be permanently combined with the material of the bellows.

To the upper edge of the lens 5 is secured a pair of socket members 17, 18, the opposed recesses of which are of a size freely to receive ends of the rod 13 and the distance between these members is calculated correctly to seat the ends of the rod therein. In order to assemble the parts, it is merely required to flex the rod sufficiently to aline the ends of the rod with the sockets. The rod will then spring into position firmly to attach the lens to the bellows of the casing 10. To a nipple 20, at the top of the casing, is secured a flexible tube 21 the end of which may, as shown in my said earlier patent, be fitted with a mouthpiece. When the wearer of the device wishes to raise the lens to uncover the window 6, it is merely required to place the mouthpiece in the mouth and by applying suction to draw the bellows into the upper part of the casing thereby to raise the lens. It is important to note that, because the suction causes the bellows to cling to the inner surface of the casing, it will remain in this position even after the mouthpiece has been withdrawn from the mouth and that a blow of air through the mouthpiece is required again to return the lens to window closing position.

While this manner of operation has been found acceptable, it may at times be found so inconvenient to maintain the mouthpiece in position between the teeth and so much of an effort to actuate the shutter mechanism by suction and blows of air through the mouth that external means of operation is preferable. I have solved this problem by connecting the shutter mechanism for electrical actuation, substantially as illustrated in Fig. 1. The flexible tube 21 is in this view shown seated in one end of a cylinder 25 to communicate with the space within this cylinder. A piston 26 is mounted within this space and it is by a rod 27 connected to the core 28 of a solenoid magnet 29. The latter is placed in a circuit extending from a source of energy 31 and a switch 32 is cut into this circuit. As illustrated in Fig. 1, this switch has been closed to energize the magnet to move the piston into the position indicated, against the tension of the spring 33, thereby to force air into the casing 10 and so to move the lens into the closing position shown in the drawing. When the switch again is opened, it is found that the spring will push the piston to the right, by suction to elevate the lens 5. A vent 30 should be placed in the inner wall of the cylinder.

In cases where the welding operation is electrically controlled, this arrangement has the great advantage that the solenoid circuit may be cut into the welding circuit in such a manner that one of the conductors, as 34, will be connected to the welding tool and the other conductor 35 be grounded. When so connected, it is found that the magnet circuit will become energized the moment the tool is applied to the parts to be welded, thereby automatically to lower the lens into closing position. The operator will, when such automatic shutter actuating means is employed, be entirely free to do his work without having to spend any thought on the shutter operation. The switch will not be required for closing the circuit each time the tool is applied to the work, but it may be found advantageous to retain the switch in the circuit for use in emergencies. The cylinder will preferably be placed with the welding apparatus and the tube 21 should be long enough to extend to the shutter mechanism.

However, in cases where an extra operation to actuate the shutter mechanism is not found objectionable, the device may be simplified by placing a fingerpiece 36 directly on the piston rod 27, as indicated in dotted outline in Fig. 1, for manual operation of the piston to move the lens.

Where I have hereinbefore described preferred forms of the invention I do not intend thereby to be limited to the arrangements, shapes and proportions exactly as illustrated in the drawings but reserve the right to embody modifications therein within the scope of the claim hereto appended. It may, for example, be found preferable instead of the rigid cylinder 25 to employ a bellows or rubber bulb, in which case the piston 26 would be omitted and the piston rod would be connected directly to the bellows or bulb, the spring would maintain the bellows or bulb distended and a pull on the rod would collapse the bellows or bulb, against the tension of the spring, to force the lens into closing position.

I claim:

A welder's eye protector comprising, an open top frame made in two parts, the frame parts being recessed to provide a rectangular space therebetween and having alined eye openings through the recessed portions thereof, the upper portion of the space being widened to form a curved seat, a collapsible support comprising a rigid hollow upper member open at the bottom and a hollow flexible lower member open at the top, the upper rim of the lower member being mounted on the outer surface of the rim of the upper member, the combined rims of the two members being held tightly lodged in the curved seat of the frame parts, a glare-proof lens, means for attaching said lens to the bottom of the flexible member of the support, means for clamping the frame parts together to maintain the support and lens in position therebetween and to prevent detachment of the lens from the support, and means for collapsing the support to raise the lens above the eye openings.

References Cited in the file of this patent

UNITED STATES PATENTS

| | | |
|---|---|---|
| 1,822,308 | Norton | Sept. 8, 1931 |
| 2,272,001 | Goode | Feb. 3, 1942 |
| 2,384,517 | Zimmerman et al. | Sept. 11, 1945 |
| 2,549,445 | Friess | Apr. 17, 1951 |
| 2,549,964 | Dening | Apr. 24, 1951 |